United States Patent [19]
Kolibas

[11] 3,953,124
[45] Apr. 27, 1976

[54] HANDLING OF ORIGINALS TO BE PHOTOCOPIED

[75] Inventor: James A. Kolibas, Broadview Heights, Ohio

[73] Assignee: Addressograph Multigraph Corporation, Cleveland, Ohio

[22] Filed: June 17, 1974

[21] Appl. No.: 479,651

[52] U.S. Cl. .................................... 355/75; 355/25
[51] Int. Cl.² ........................................ G03B 27/62
[58] Field of Search .................. 355/25, 47, 48, 49, 355/50, 51, 64, 65, 66, 75, 76, 82; 271/198, 200, 207, 273, 274, 275; 198/126

[56] References Cited
UNITED STATES PATENTS

| | | | |
|---|---|---|---|
| 2,184,698 | 12/1939 | Heybourne | 355/25 |
| 2,282,768 | 5/1942 | Pickett | 355/25 |
| 3,545,745 | 12/1970 | Herman | 271/198 |
| 3,606,307 | 9/1973 | Herman | 271/275 |
| 3,618,934 | 11/1971 | Germuska | 271/274 |
| 3,661,383 | 5/1972 | Morrison | 271/273 |
| 3,726,589 | 4/1973 | Difulvio et al. | 355/75 X |
| 3,790,158 | 2/1974 | Summers | 271/207 |

*Primary Examiner*—L. T. Hix
*Assistant Examiner*—Alan Mathews

[57] ABSTRACT

The illumination station of a photocopier is arranged with a downwardly facing transparent platen to which the originals are presented for copying. There is an original support platen opposed to and beneath the transparent platen which can be raised and lowered to present to the transparent platen three-dimensional originals, such as books, of varying thicknesses. The upper surface of the original support platen incorporates a transport by means of which originals of the sheet type may be fed seriatim into the illumination station when the original support platen is in its uppermost position.

9 Claims, 5 Drawing Figures

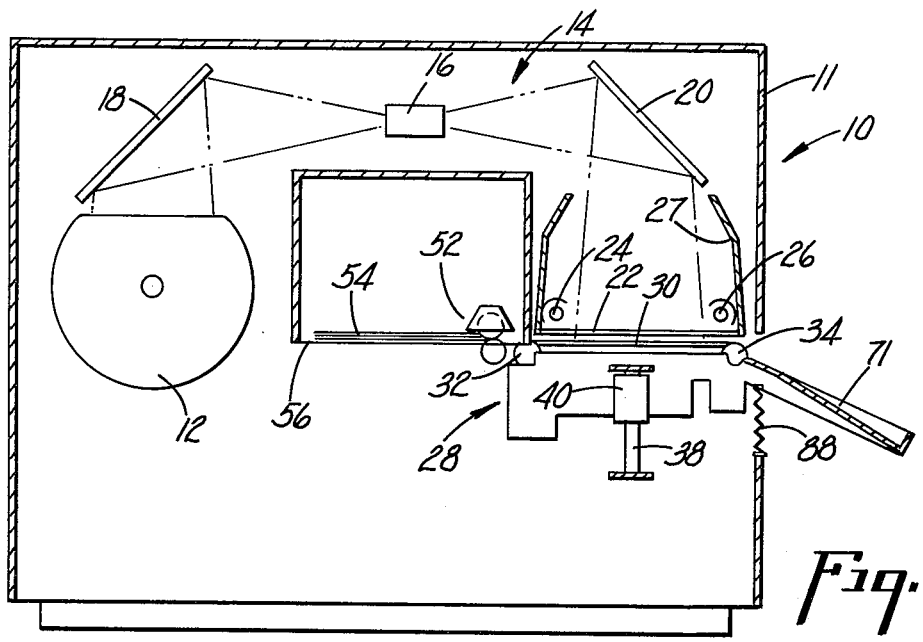
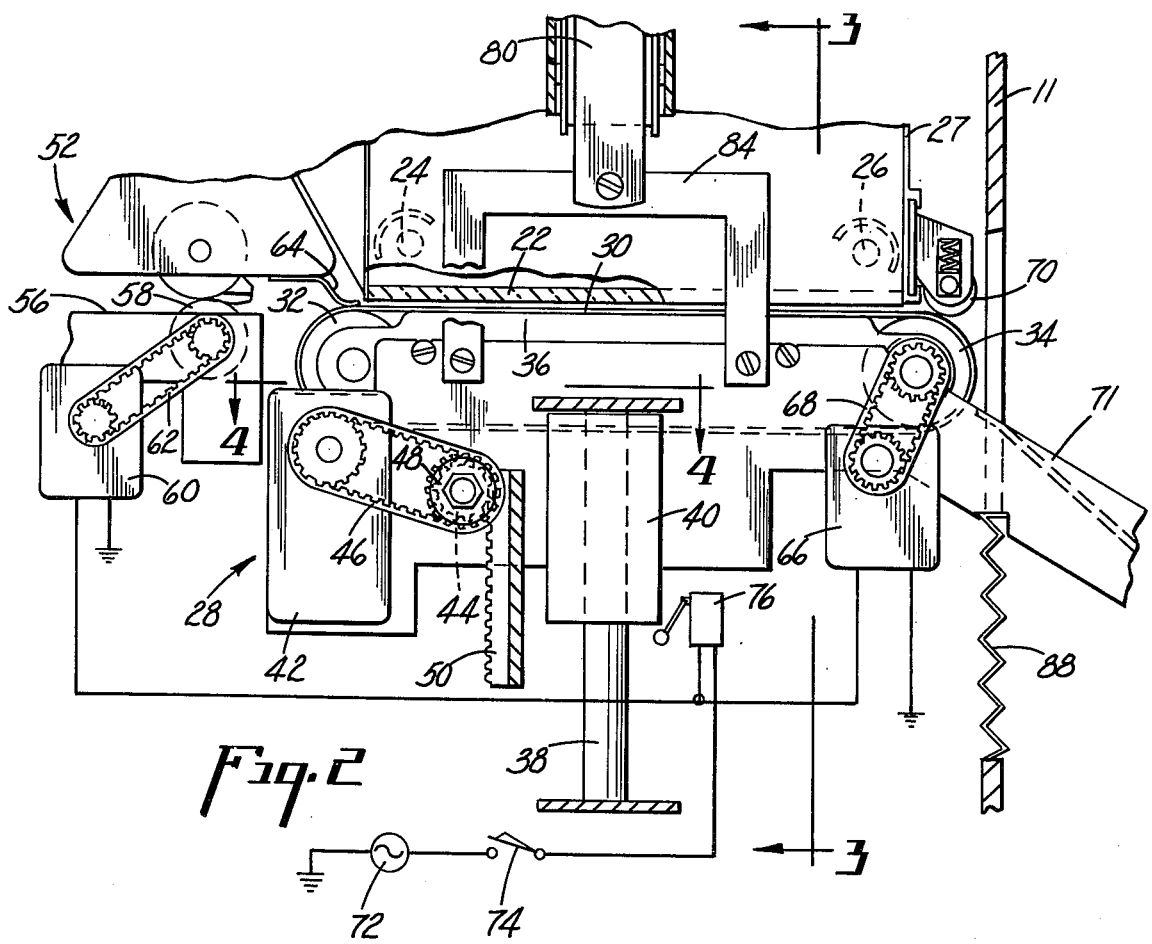

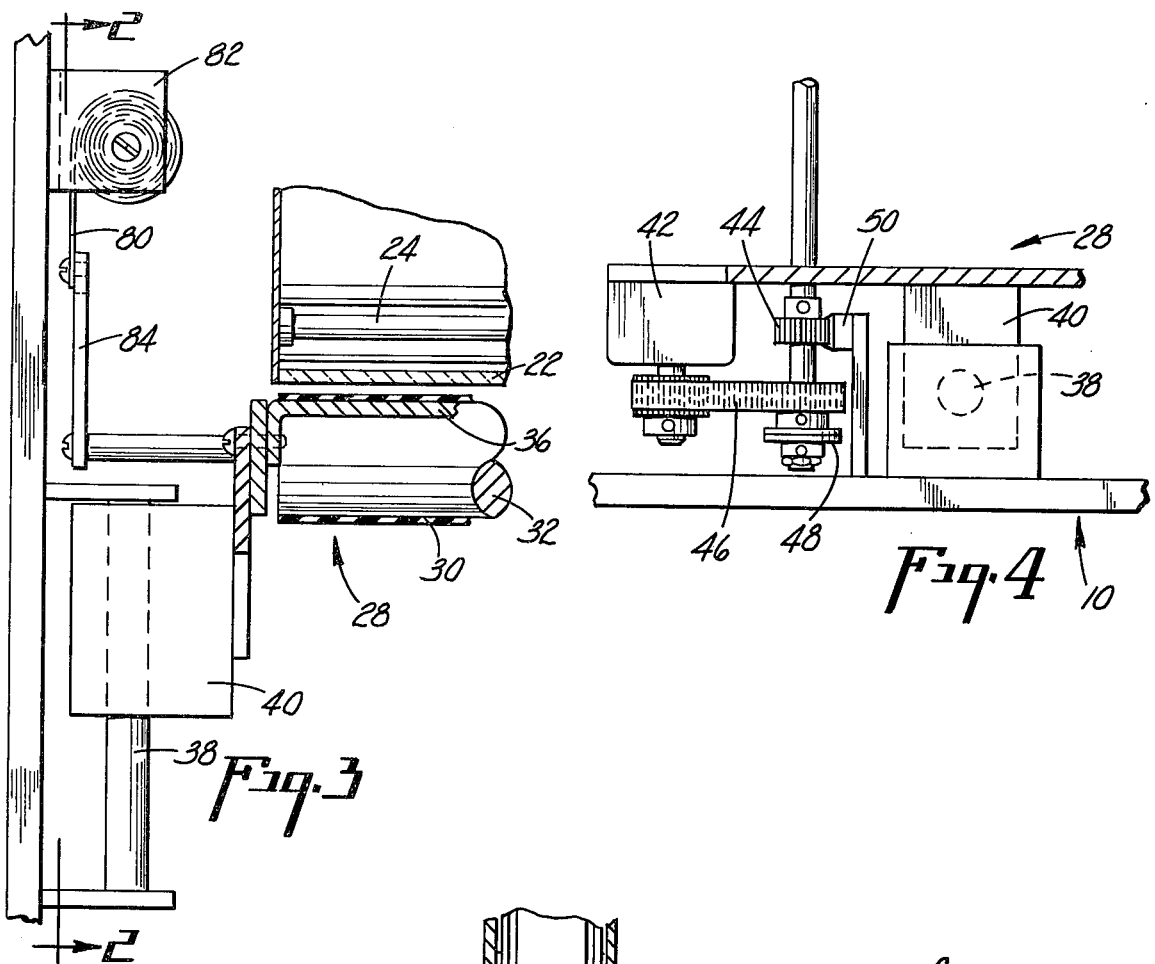
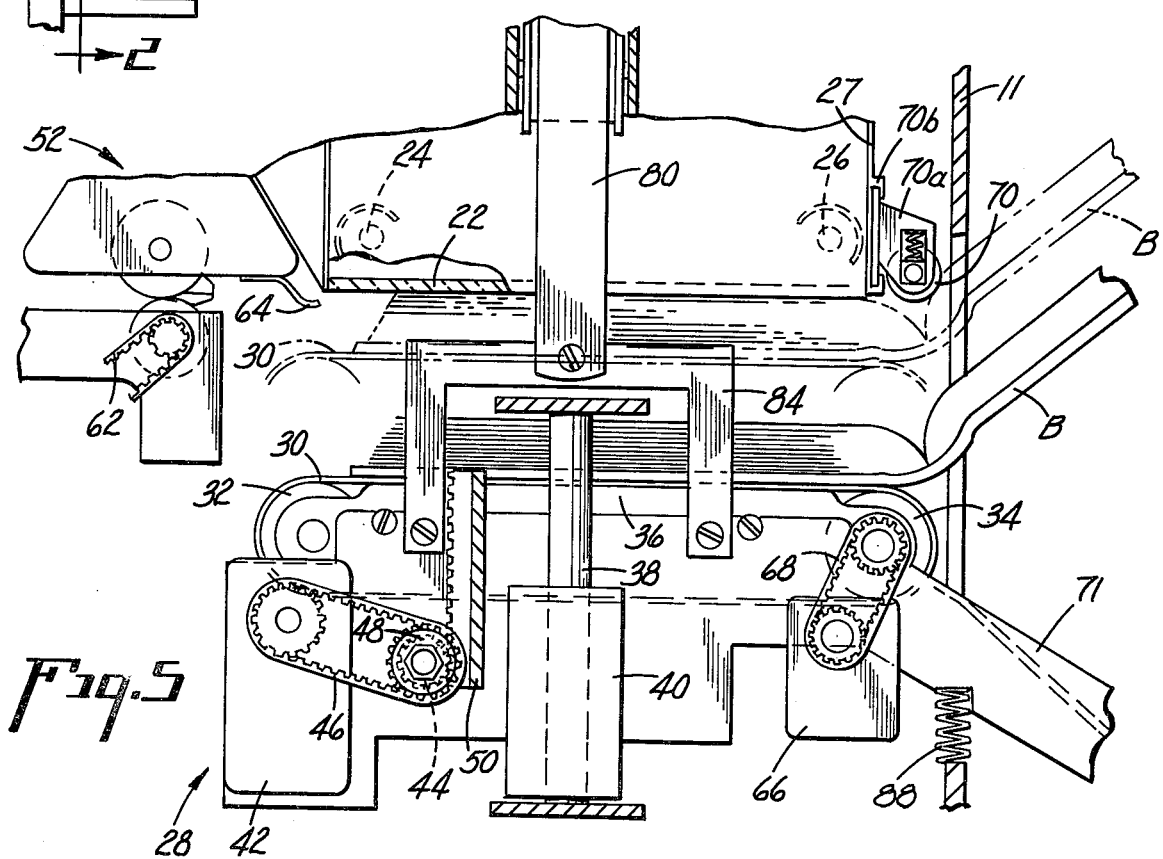

HANDLING OF ORIGINALS TO BE PHOTOCOPIED

This invention relates to photocopying equipment and methods, especially to the handling of original documents which are to be copied.

One of the problems involved in copying, especially in high volume office copying, is that of providing conveniently for handling sheet type originals as well as three-dimensional objects, particularly books, during exposure without incurring the expense of providing plural optical input locations. The handling problems, of course, are different and the means devised for holding and/or feeding the originals in relation to a single illumination station when designed to handle both, are usually a compromise which works successfully for both, but which is not really fully efficient or convenient for either.

The present invention provides an arrangement which handles sheet originals effectively, either by hand or more especially by automatic feeding techniques, and which is quickly and readily convertible to handle book type originals in cooperation with the same illumination platen as used for the sheets.

As an additional feature, the invention irrespective of its sheet copying aspects, provides a novel arrangement for copying three-dimensional or book type originals in a face-up orientation, so as to bring them upwardly against an illumination platen and thereby minimize the liklihood of discomfort for the operator from the exposure lamps which are accordingly downwardly directed.

The invention provides, in particular, an optical system terminating in a transparent exposure platen which has a downwardly facing exposed surface, and which is opposed by an original support platen having a surface which is disposed in a plane parallel to and normally quite close to but spaced slightly from that of the transparent platen. In the preferred form the surface of the original support platen takes the form of a belt for feeding sheet originals into and then out of illumination position. The moving originals are carried past the illumination station without being forced into contact with the transparent platen as is the customary procedure. This minimizes static build-up on the sheets, allowing them to be handled and fed more readily. It also prevents scratching of the transparent platen by staples, by the paper itself, or by grit trapped between the sheet surface and the platen. The spacing between the sheet and platen, however, is minor and readily accomodated by the latitude in the optical system.

Lowering and raising means are also provided which allow the original support platen to be lowered away from the transparent platen a distance sufficient to receive a three-dimensional object to be copied, and then to be raised until the object, such as a book is pressed lightly against the transparent platen for illumination in order to expose the image receiving medium.

The preferred form of the invention is illustrated in the accompanying drawings in which:

FIG. 1 is a somewhat diagrammatic vertical section of a copying machine embodying the present invention;

FIG. 2 is a detail elevation, with parts shown in section, of the original handling portion of the equipment of FIG. 1, shown to a larger scale, and including certain electrical features schematically illustrated.

FIG. 3 is a detail section taken on line 3—3 of FIG. 2;

FIG. 4 is a detail section taken on line 4—4 of FIG. 2; and

FIG. 5 is a view similar to FIG. 2 but illustrating two different positions of the original support platen occurring during the positioning of a three-dimensional object for illumination.

The copier of the present invention is indicated generally at 10, and, in the preferred form illustrated, includes a housing 11, and an image receiving medium in the form of a photoconductive cylinder 12 upon which images may be formed by light exposure, developed with electroscopic powder, and transferred to copy sheets in a known manner. The photoconductive cylinder is so arranged that the photoconductor is a flexible strip which can be disposed in a plane at the exposure station, permitting a full frame flash exposure, and is capable of being reformed as a cylinder for processing and transfer of the image to copy sheets.

The image is cast upon the photoconductor by way of an optical system 14 which includes a lens 16 and mirrors 18 and 20, and an illumination station in the form of a platen 22 of transparent glass illuminated by lamps 24 and 26 enclosed in a lamp housing 27.

Opposing the platen 22 is an original support platen 28 whose upper surface is normally spaced a short distance, e.g. one-sixteenth inch, below the bottom surface of platen 22. The surface of the original support platen takes the form of a belt 30 running on drums 32 and 34 and backed up by a rigid guide surface or back-up platen 36, and constituting a transport for original documents of the sheet type.

The platen 28 is shiftable up and down on guide rods 38, one at either side of the platen 28, rigidly attached to the machine frame (only one such guide rod being shown in the drawing). The rods 38 are slidably received in linear bearings 40 which are affixed to the frame of platen 28, one at each side thereof.

Power for raising and lowering the platen is provided by an electric motor 42 which is carried on the frame of the platen 28 and drives a pinion 44 by means of a toothed belt drive 46 through a slip clutch 48 (FIG. 4). The pinion 44 meshes with a rack 50 which is rigidly attached to the frame of machine 10. The motor 42 is reversible and its operation is controlled by forward and reverse push button switches (not shown) in the usual manner, the switches being located in a position on the machine frame for convenient accessibility by the operator.

For the feeding of sheet type originals, the platen 28 is, of course, placed in raised position as in FIGS. 1 and 2 so that the belt 30 is closely adjacent the glass platen 22.

Means are provided for feeding originals, face up, to the surface of the belt comprising sheet feeder 52 which feeds sheets from the bottom of a stack 54 placed on a receiving table 56 attached to a stationary portion of the machine frame. The sheet motivating element of the feeder 52 is a roller 58 driven by a motor 60 through a toothed belt drive 62, all mounted on the main machine frame.

Mounted on a suitable portion of the machine frame are guide fingers 64 cooperating with the surface of the belt 30 (when the platen 28 is in raised position) in a manner to guide a sheet being advanced by the feeder 52 onto the belt surface and beneath the edge of the glass platen 22.

Movement of the belt 30 is effected by a motor 66, mounted on the frame of platen 28, which drives the pulley 34 by means of a toothed belt drive 68, and a spring urged roller 70 mounted on the machine frame cooperates with the belt 30 at drum 34 to move a document forward and out of illumination position at the appropriate time; depositing it in a receiving tray 71 carried by the platen structure 28 for movement therewith.

A simplified electrical system for energizing and controlling the automatic document feed illustrated, including a source of electric power 72 which is connected in parallel to the motors 60 and 66. The application of power is controlled by two switches in series. Switch 74 is a manual switch for intiating feeding of originals when the operator wishes, and switch 76 is a limit switch which closes only when the original supporting platen 28 is in fully raised position with the surface of the belt 30 about one-sixteenth inch below the bottom surface of platen 22. Thus the switch 76 must be closed to signal a fully raised position of the platen 28 before it is possible for the operator to initiate the feeding of original documents using switch 74.

It will be appreciated that various control details and refinements may be employed, including circuitry for timing the entire machine operation so as to flash the illumination lamps 24, 26 when the original document on the belt 30 and the cylinder 12 are both moving and in precisely the correct relative position for exposure. In the alternative, the motors 66 and 60 driving belt 30 and sheet feeder 52 may be deenergized to stop momentarily the feed of original sheets when proper location of the sheet on belt 30 is sensed, the lamps 24, 26, then being flashed when a signal is given that the moving cylinder 12 has reached correct exposure position, and the motors 66 and 60 thereafter being immediately restarted to feed the first original forward to the receiving tray 71 and to introduce the next original. The details of controls of this nature, however, have not been illustrated since they do not bear directly on the present invention.

Except for discussion of the motor 42 and the rack and pinion mechanism 44, 50, the foregoing description deals essentially with the means used to expose original documents of the sheet type. When it is desired to use a three-dimensional original, for example when it is desired to copy a page of a book, the sheet feed apparatus is disabled by opening switch 74, or in any case by the opening of switch 76 when the document support platen is lowered, thereby breaking the circuit to both motors 60 and 66 and thus immobilizing the belt 30.

To ready the apparatus to receive a book, the operator presses the previously mentioned control button which will cause the shift of motor 42 to rotate in a counterclockwise direction as seen in FIG. 2. This will effect rotation of the pinion 44 in a counterclockwise direction, causing it to roll down the stationary rack 50, thereby lowering the platen 28 to the position seen in full lines in FIG. 5. The slip clutch 48 prevents injury to the parts or to the motor 42 in case the switch could be actuated for a period longer than required in either a lowering or raising direction, such that the platen bearings come up against either end stop, or an object of the support platen comes into engagement with the glass platen 22. It also prevents injury in case the operator's hand is inadvertently placed between the platens, and all such devices will be understood as comprehended in the term "force limiting means" when used hereinafter.

In this connection it will be appreciated that the slip clutch 48 is only one type of force limiting arrangement which could be applied, and that others, such as a pneumatic lift system with pressure limiting controls would be equally applicable.

The solid lines in FIG. 5 show the original support platen 28 in lowered position. The maximum lowering travel may be any desired amount, but a value of three inches allows adequate space for easy introduction of most books. As can be seen in FIG. 5, a book B has been shown, placed with its cover lying on the surface of the belt 30. The platen is then raised to the broken line position by operating the reverse control button for motor 42. In this position the page of the book will be pressed against the transparent platen 22 with a light force, thereby preparing it for illumination to expose the photoconductor.

The positioning of the platen 28 can take place in a number of ways, and in the form shown in the drawings, the weight of the platen is counterbalanced by weights or spiral strip springs, one of the latter being shown at 80. The coil housings 82 of the springs 80 are mounted at suitable points on the machine frame as seen in FIG. 2 for one side of the machine, and the free end of each spring is attached to a yoke 84 which is affixed to the frame of platen 28. With this arrangement the counterbalancing effect can be so selected or adjusted that a book of average weight can be placed on the platen, and little or no force will be required to raise the platen, the platen being retained in any position in which it is stopped by the friction of the parts.

In some instances it may be desirable to omit the springs 80 and yokes 84, at the same time mounting the optical system 14 in complete cantilever fashion, supported from the left hand portion of the machine frame as seen in FIG. 1. Such an arrangement would permit unusually large originals, either sheets or books, to be introduced between the platens and to be shifted about without interference so as to select certain areas thereof for illumination and copying by the machine. In such a situation the counterbalancing effect can be produced by lowering the yokes 84 and directing the springs 80 over pulleys to act in a downward direction, or by using long compression springs as counterbalance agents.

On the other hand, if counterbalancing is dispensed with, the motor 42 would be so selected as to be capable of driving the loaded platen 28 without counterbalance assistance, and would be provided with a drive system of the type which will transmit motion only when torqued from the normal input end, for example a worm and worm wheel train, locking the platen 28 in whatever position it occupies when the motor 42 is stopped.

In some situations it may be possible to design the location of the feed roller 70 so that the interference offered by it during book copying is insignificant. If, however, the particular construction adopted does place it in a position such that the copying or a marginal area of the book page is prevented or made difficult by the presence of the roller 70, this will be handled without inconvenience if the roller 70 is carried by a bracket 70a mounted for shiftable adjustment between a central operative position and a lateral idle position out of the path of book originals. The track 70b (FIGS. 2 and 5) provides for such adjustment manually by the operator when needed.

It will also be appreciated that mounting of the roller 70 on the lamp housing 27 or on the machine housing 11 for upward motion of a sliding or swinging nature, or mounting the roller 70 upon the original support platen for downward swinging motion would achieve a similar result, i.e. displacement of the roller to a non-interfering position.

Since the frame of the machine provides an opening through which the movable receiving tray 71 projects, the machine appearance as well as safety is enhanced by providing an accordian type closure 88 which accomodates itself to the platen position and closes the opening in whatever position the platen 28 finds itself.

From the foregoing description it can be seen that the present invention provides an arrangement for handling originals of different types in association with a single illumination station in a copying machine and does so in a very convenient and flexible manner so that either type of original can be handled quickly and easily without sacrifice of the effectiveness of the means for handling the other, and under circumstances such that conversion from one type to the other can be effected without significant delay.

What is claimed is:

1. A photocopying machine comprising:
   an optical system terminating in an original illumination station comprising a fixed transparent platen;
   a back-up platen opposing said transparent platen;
   document transport means for feeding documents one by one between said platens;
   means mounting said transport means and back-up platen for movement bodily towards and away from said transparent platen and maintaining the same in parallelism therewith; and
   means for jointly fixing said transport means and said back-up platen at any selected spacing from said transparent platen to accommodate three-dimensional originals of varying thicknesses between said transparent platen and said transport means and back-up platen.

2. A photocopying machine as set forth in claim 1 in which there is provided power means activatable by the operator for jointly moving said transport means and said support platen towards and away from said transport platen.

3. A photocopying machine as set forth in claim 2 in which the power means includes force limiting means to prevent damage to the equipment or to a three-dimensional original, or injury to the operator.

4. A photocopying machine as set forth in claim 1 in which there is provided means for limiting the travel of the transport means and back-up platen towards the transparent platen to a position such that its surface nearest the transparent platen is spaced slightly from the adjacent surface of the transparent platen to permit passage therebetween of sheet type originals without significant rubbing of the original upon the surface of the transparent platen.

5. A photocopying machine comprising:
   an optical system terminating in an illumination station comprising a fixed downwardly facing transparent platen;
   a back-up platen opposing said transparent platen;
   document transport means for feeding documents one by one between said platens;
   means mounting said transport means and back-up platen for vertical movement bodily towards and away from said transparent platen and maintaining the same in parallelism therewith; and
   means for jointly fixing said transport means and said back-up platen at any selected spacing from said transparent platen to accommodate three-dimensional originals of varying thicknesses between said transparent platen and said transport means and back-up platen.

6. A photocopying machine as set forth in claim 5 in which the vertically movable transport carries with it a receiving tray for receiving original documents as they are fed from the transport.

7. A photocopying machine as set forth in claim 5 in which there are mounted on the machine, guide means located at a fixed level with respect to said transparent platen, cooperable with said transport in its raised position for feeding documents between the platen and the surface of the transport.

8. A photocopying machine as set forth in claim 7 in which the guide means includes a feed roller coactable with a sheet on the surface of said transport.

9. A photocopying machine as set forth in claim 8 in which there is provided mounting means for said feed roller such that it is shiftable to an inactive position avoiding interference with the original when the transport is being used as a support for an original of the three-dimensional type.

* * * * *

UNITED STATES PATENT AND TRADEMARK OFFICE
CERTIFICATE OF CORRECTION

PATENT NO. : 3,953,124
DATED : April 27, 1976
INVENTOR(S) : James A. Kolibas

It is certified that error appears in the above-identified patent and that said Letters Patent are hereby corrected as shown below:

| | |
|---|---|
| Column 3, lines 66 to 68 | After "platens" in line 66, the comma should be changed to a period and the balance of the sentence should be deleted. |
| Column 4, line 5 | The period after "applicable" should be changed to a comma, and there should be inserted immediately following the said comma:<br>--and all such devices will be understood as comprehended in the term "force limiting means" when used hereinafter.-- |
| Column 4, line 60 | "or" should be --of--. |

Signed and Sealed this

Twenty-first Day of December 1976

[SEAL]

Attest:

RUTH C. MASON
*Attesting Officer*

C. MARSHALL DANN
*Commissioner of Patents and Trademarks*